(12) United States Patent
Xing et al.

(10) Patent No.: US 11,196,507 B2
(45) Date of Patent: Dec. 7, 2021

(54) ANTI-EAVESDROPPING METHOD FOR IOV BASED ON INTERMITTENT COOPERATIVE JAMMING

(71) Applicant: CHANGSHU INSTITUTE OF TECHNOLOGY, Jiangsu (CN)

(72) Inventors: Xiaoshuang Xing, Jiangsu (CN); Gaofei Sun, Jiangsu (CN)

(73) Assignee: CHANGSHU INSTITUTE OF TECHNOLOGY, Jiangsu (CN)

( * ) Notice: Subject to any disclaimer, the term of this patent is extended or adjusted under 35 U.S.C. 154(b) by 0 days.

(21) Appl. No.: 17/043,687

(22) PCT Filed: Nov. 22, 2019

(86) PCT No.: PCT/CN2019/120081
§ 371 (c)(1),
(2) Date: Sep. 30, 2020

(87) PCT Pub. No.: WO2021/068369
PCT Pub. Date: Apr. 15, 2021

(65) Prior Publication Data
US 2021/0266092 A1    Aug. 26, 2021

(30) Foreign Application Priority Data
Oct. 8, 2019    (CN) .......................... 201910949661.1

(51) Int. Cl.
*H04K 3/00* (2006.01)
*H04W 12/033* (2021.01)
(Continued)

(52) U.S. Cl.
CPC ................. *H04K 3/40* (2013.01); *H04K 3/86* (2013.01); *H04L 1/0005* (2013.01);
(Continued)

(58) Field of Classification Search
CPC .. H04K 3/40; H04K 3/00; H04K 3/86; H04W 12/033; H04L 1/0005; H04L 1/0011; H04L 27/0008
See application file for complete search history.

(56) References Cited

U.S. PATENT DOCUMENTS 8,203,478 B1 *   6/2012   Huneycutt ............... H04K 3/28
                                                      342/14
9,085,362 B1 *   7/2015   Kilian ..................... B64C 25/68
(Continued)

FOREIGN PATENT DOCUMENTS

CN    109743729    5/2019
CN    110248360    9/2019
(Continued)

OTHER PUBLICATIONS

Wang (Eavesdropping and Jamming . . . for suspicious UAVs) Mar. 2019 (Year: 2019).*
(Continued)

*Primary Examiner* — Dong-Chang Shiue
(74) *Attorney, Agent, or Firm* — JCIP Global Inc.

(57) ABSTRACT

Disclosed is an anti-eavesdropping method for the Internet of Vehicles (IoV) based on intermittent cooperative jamming. The method comprises: on the premise of effectively preventing an illegitimate user $V_e$ from information eavesdropping, first establishing optimization problems for the purpose of minimizing an energy consumption of a cooperative jamming user $V_j$; analyzing unique communication characteristics of the IoV based on the Wireless Access in Vehicular Environments (WAVE) protocol, to obtain time structures of physical-layer data packets in the IoV and physical-layer data packet duration; and calculating the shortest physical-layer data packet duration in the IoV; then solving an optimal cooperative jamming scheme for any available power range for the cooperative jamming user $V_j$;
(Continued)

and finally, conducting, by the cooperative jamming user $V_j$, periodic repetition according to the solved optimal cooperative jamming schemes in a period of data transmission between legitimate users, until transmission between the legitimate users ends.

4 Claims, 3 Drawing Sheets

(51) Int. Cl.
*H04L 1/00* (2006.01)
*H04L 27/00* (2006.01)

(52) U.S. Cl.
CPC ........ *H04L 1/0011* (2013.01); *H04L 27/0008* (2013.01); *H04W 12/033* (2021.01)

(56) References Cited

U.S. PATENT DOCUMENTS

| | | | |
|---|---|---|---|
| 9,110,148 B1* | 8/2015 | Coakley | G01S 7/021 |
| 9,322,907 B1* | 4/2016 | Kadambe | H04L 27/0012 |
| 2008/0297395 A1* | 12/2008 | Dark | G01S 7/021 |
| | | | 342/14 |
| 2011/0029644 A1 | 2/2011 | Gelvin et al. | |
| 2017/0293019 A1* | 10/2017 | Caldwell | G01S 7/38 |

FOREIGN PATENT DOCUMENTS

| | | | | |
|---|---|---|---|---|
| CN | 110248360 A | * | 9/2019 | |
| WO | WO-2018224488 A1 | * | 12/2018 | ............... H04K 3/28 |
| WO | WO-2019136463 A1 | * | 7/2019 | ............. G08B 5/002 |

OTHER PUBLICATIONS

"International Search Report (Form PCT/ISA/210) of PCT/CN2019/120081," dated Jun. 9, 2020, pp. 1-4.

Qinghe Gao, et al., "Joint design of jammer selection and beamforming for securing MIMO cooperative cognitive radio networks," IET Communications, vol. 11, Feb. 2017, pp. 1-11.

Peyman Siyari, et al., "Distributed Power Control in Single-Stream MIMO Wiretap Interference Networks With Full-Duplex Jamming Receivers," IEEE Transactions on Signal Processing, vol. 67, Feb. 2019, pp. 594-608.

Yupeng Li, et al., "Cooperative Jamming for Secure UAV Communications With Partial Eavesdropper Information," IEEE Access, vol. 7, Jul. 2019, pp. 94593-94603.

Zahra Mobini, et al., "Wireless-Powered Full-Duplex Relay and Friendly Jamming for Secure Cooperative Communications," IEEE Transactions on Information Forensics and Security, vol. 14, Mar. 2019, pp. 621-634.

Yan Huo, et al., "Secure Communications in Tiered 5G Wireless Networks With Cooperative Jamming," IEEE Transactions on Wireless Communications, vol. 18, Jun. 2019, pp. 3265-3280.

Yair Allouche, et al., "Secure communication through jammers jointly optimized in geography and time," Pervasive and Mobile Computing, vol. 41, Aug. 2017, pp. 1-26.

* cited by examiner

ANTI-EAVESDROPPING METHOD FOR IOV BASED ON INTERMITTENT COOPERATIVE JAMMING

CROSS-REFERENCE TO RELATED APPLICATION

This application is a 371 of international application of PCT application serial no. PCT/CN2019/120081, filed on Nov. 22, 2019, which claims the priority benefit of China application no. 201910949661.1, filed on Oct. 8, 2019. The entirety of each of the above mentioned patent applications is hereby incorporated by reference herein and made a part of this specification.

BACKGROUND

Technical Field

The present invention relates to the field of communication security, and in particular, to an anti-eavesdropping method for the Internet of Vehicles (IoV) based on intermittent cooperative jamming.

Description of Related Art

The IoV based on Wireless Access in Vehicular Environments (WAVE) can efficiently enhance the traffic safety and improve the driving experience, thus being widely recognized at home and abroad for its development prospect. Vehicle information, road information, and entertainment information are transferred in the IoV through wireless communications between vehicles and between the vehicles and roadside equipment, laying foundation for achievement of various functions of the IoV. However, wireless communications have broadcasting characteristics, such that different information in the IoV is easily eavesdropped by an illegitimate user. As stipulated in the WAVE protocol, information transferred in the IoV necessarily includes private information such as the identification, size, position, speed, and direction of the vehicle. Once such information is captured by the illegitimate user, the identity of a vehicle owner, a driving trajectory, a parking position, and the like are revealed. The illegitimate user may accordingly attack or steal the vehicle, seriously threatening the personal and property safety of the vehicle owner. Therefore, it is in urgent need to design a reliable anti-eavesdropping method to overcome such a threat in the IoV. Cooperative jamming is an anti-eavesdropping technology which is widely used at present. In the following documents [1], [2], [3], [4] and [5], the cooperative jamming technology is applied in the cognitive radio network, Multiple Input Multiple Output (MIMO) network, unmanned aerial vehicle (UAV) network, energy sensing network, and 5G network respectively, so as to prevent the illegitimate user from information eavesdropping. The documents conduct in-depth studies on selections of a cooperative jamming user, a beamforming design, optimization of a UAV flight path, allocation of transmit power to cooperative jamming users, analysis of a confidential capacity, and other aspects.

[1] Q. Gao, Y. Huo, L. Ma, X. Xing, X. Cheng, T. Jing, and H. Liu, "Joint design of jammer selection and beamforming for securing mimo cooperative cognitive radio networks," IET Communications, vol. 11, no. 8, pp. 1264-1274, 2017.

[2] P. Siyari, M. Krunz, and D. N. Nguyen, "Distributed power control in single-stream mimo wiretap interference networks with full-duplex jamming receivers," IEEE Transactions on Signal Processing, vol. 67, no. 3, pp. 594-608, February 2019.

[3] Y. Li, R. Zhang, J. Zhang, S. Gao, and L. Yang, "Cooperative jamming for secure uav communications with partial eavesdropper information," IEEE Access, vol. 7, pp. 94 593-94 603, 2019.

[4] Z. Mobini, M. Mohammadi, and C. Tellambura, "Wireless-powered full-duplex relay and friendly jamming for secure cooperative communications," IEEE Transactions on Information Forensics and Security, vol. 14, no. 3, pp. 621-634, March 2019.

[5] Y. Huo, X. Fan, L. Ma, X. Cheng, Z. Tian, and D. Chen, "Secure communications in tiered 5g wireless networks with cooperative jamming," IEEE Transactions on Wireless Communications, vol. 18, no. 6, pp. 3265-3280, June 2019.

[6] Y. Allouche, E. Arkin, Y. Cassuto, A. Efrat, G. Grebla, J. Mitchell, S. Sankararaman, and M. Segal, "Secure communication through jammers jointly optimized in geography and time," Pervasive and Mobile Computing, vol. 41, pp. 83-105, 10 2017.

The studies in the foregoing documents [1] to [5] are all based on a continuous cooperative jamming technology, requiring the cooperative jamming user to continuously transmit jamming signals in a whole communication process between legitimate users, such that the cooperative jamming user needs to consume a lot of energy to prevent eavesdropping by an illegitimate user. The document [6] proposes a probabilistic cooperative jamming technology, in which the cooperative jamming user transmits a jamming signal at a probability of p when legitimate users send each bit of information. This method can reduce energy consumption of the cooperative jamming user, but is applicable only to a static scenario and requires a buffer zone for separating legitimate users from illegitimate users. To sum up, none of the known existing technologies is applicable to the IoV, and has poor performance in reduction of the energy consumption of the cooperative jamming user. Thus, it is necessary to design an anti-eavesdropping method which is applicable to the IoV and has a low energy consumption based on the unique communication characteristics of the IoV.

SUMMARY

The technical problem to be solved by the present invention is to provide an anti-eavesdropping method for the IoV based on intermittent cooperative jamming, such that the cooperative jamming user can prevent an illegitimate user from eavesdropping on IoV communication information with the minimum energy consumption.

The present invention adopts the following technical method to solve the foregoing technical problem.

An anti-eavesdropping method for the IoV based on intermittent cooperative jamming includes the following steps:

step 1): on the premise of effectively preventing an illegitimate user $V_e$ from information eavesdropping, establishing optimization problems for the purpose of minimizing an energy consumption of a cooperative jamming user $V_j$:

$$\min_{J_D, J_I, P_j} E = \frac{J_D}{J_D + J_I} \cdot P_j \qquad (1)$$

s.t.

-continued $$P_e \geq P_e^C \quad (2)$$

$$P_e^I \leq P_e^C \leq P_e^D \quad (3)$$

$$J_D + J_I \leq T_{min}^{PHy} \quad (4)$$

$$\min_{J_D, J_I, P_j} E = \frac{J_D}{J_D + J_I} \cdot P_j \quad (1)$$

s.t.

$$P_e^I \leq P_e^C \leq P_e^D \quad (3)$$

$$J_D + J_I \leq T_{min}^{PHy} \quad (4)$$

where the expression (1) is an optimization objective, and the expressions (2), (3), and (4) are all constraint conditions; in these expressions, $J_D$ is duration of a jamming time slot, and $J_I$ is duration of a jamming interval; $V_j$ sends a jamming signal at power $P_j$ for $J_D$ and then stops sending the jamming signal for $J_I$; $J_D+J_I$ constitutes a jamming cycle which repeats in a period of data transmission between legitimate users; $P_e^C$ is an error-correcting capability of the illegitimate user $V_e$;

$$P_e = \frac{J_D}{J_D + J_I} P_e^D + \frac{J_I}{J_D + J_I} P_e^I; P_e^D$$

is a bit error probability of $V_e$ during $J_D$, and $P_e^I$ is a bit error probability of $V_e$ during $J_I$; and $T_{min}^{PHY}$ is the shortest physical-layer data packet duration in the IoV;

step 2): analyzing unique communication characteristics of the IoV based on the WAVE protocol, to obtain time structures of physical-layer data packets in the IoV and physical-layer data packet duration; and calculating $T_{min}^{PHY}$ in the expression (4);

step 3): for any available power range $P_j \in [P_j^{min}, P_j^{max}]$ for the cooperative jamming user $V_j$, calculating the optimal $P^*_j$, $J^*_I$, and $J^*_D$ to minimize the energy consumption of $V_j$; and step 4): according to the calculation results in step 3), sending, by the user $V_j$, a jamming signal at the power of $P^*_j$ for the duration of $J^*_D$ in the period of data transmission between legitimate users, and then stopping sending the jamming signal for the duration of $J^*_I$; and repeating this procedure periodically until transmission between the legitimate users ends.

As a further optimization solution of the anti-eavesdropping method for the IoV based on intermittent cooperative jamming of the present invention, in step 1), calculation formulas of $P_e^D$ and $P_e^I$ are relevant to a modulation manner used by a legitimate sender; a Q function is let to be $$Q(x) = \frac{1}{\sqrt{2\pi}} \int_x^\infty \exp\left(-\frac{u^2}{2}\right) du;$$

$E_b$ is energy spent by $V_e$ in receiving each bit of information; $N_0$ is a noise power spectral density; and $$\phi_j = \frac{P_j |h_{je}|^2}{B}$$

is a power spectral density of a jamming signal received by $V_e$, $|h_{je}|^2$ being a channel gain between $V_j$ and $V_e$, and $B$ being a channel bandwidth; then:

when the modulation manner used by the legitimate sender is binary phase-shift keying (BPSK), $$P_e^D = Q\left(\sqrt{\frac{2E_b}{N_0 + \phi_j}}\right),$$

$$P_e^I = Q\left(\sqrt{\frac{2E_b}{N_0}}\right);$$

when the modulation manner used by the legitimate sender is quadrature phase-shift keying (QPSK), $$P_e^D = Q\left(\sqrt{\frac{2E_b}{N_0 + \phi_j}}\right),$$

$$P_e^I = Q\left(\sqrt{\frac{2E_b}{N_0}}\right);$$

when the modulation manner used by the legitimate sender is 16 quadrature amplitude modulation (16-QAM), $$P_e^D = \frac{3}{8} Q\left(2\sqrt{\frac{E_b}{N_0 + \phi_j}}\right),$$

$$P_e^I = \frac{3}{8} Q\left(2\sqrt{\frac{E_b}{N_0}}\right);$$

and when the modulation manner used by the legitimate sender is 64-QAM, $$P_e^D = \frac{7}{24} Q\left(\sqrt{\frac{18E_b}{63(N_0 + \phi_j)}}\right),$$

$$P_e^I = \frac{7}{24} Q\left(\sqrt{\frac{18E_b}{63N_0}}\right).$$

As a further optimization solution of the anti-eavesdropping method for the IoV based on intermittent cooperative jamming of the present invention, in step 2), $T_{min}^{PHY}$ is relevant to the modulation manner used by the legitimate user and a coding rate:

when the modulation manner used by the legitimate sender is BPSK and the coding rate is 1/2, $T_{min}^{PHY}$=76 μs;

when the modulation manner used by the legitimate sender is BPSK and the coding rate is 3/4, $T_{min}^{PHY}$=60 μs;

when the modulation manner used by the legitimate sender is QPSK and the coding rate is 1/2, $T_{min}^{PHY}$=48 μs.

when the modulation manner used by the legitimate sender is QPSK and the coding rate is 3/4, $T_{min}^{PHY}$=40 μs;

when the modulation manner used by the legitimate sender is 16-QAM and the coding rate is 1/2, $T_{min}^{PHY}$=36 μs;

when the modulation manner used by the legitimate sender is 16-QAM and the coding rate is 3/4, $T_{min}^{PHY}$=32 μs;

when the modulation manner used by the legitimate sender is 64-QAM and the coding rate is 1/2, $T_{min}^{PHY}$=28 μs; and when the modulation manner used by the legitimate sender is 64-QAM and the coding rate is 3/4, $T_{min}^{PHY}=28$ μs.

As a further optimization solution of the anti-eavesdropping method for the IoV based on intermittent cooperative jamming of the present invention, in step 3), when the modulation manner used by the legitimate sender is BPSK, calculation formulas of $P^*_j$, $J^*_I$, and $J^*_D$ are as follows:

$$P^*_j = \begin{cases} P_j^{max} & \text{if } \left.\frac{d_{E(P_j)}}{dP_j}\right|_{P_j=P_j^{max}} \leq 0 \\ \left.\frac{d_{E(P_j)}}{dP_j}\right|_{P_j=P^*_j} = 0 & \text{if } \left.\frac{d_{E(P_j)}}{dP_j}\right|_{P_j=P_j^{min}} < 0 \\ & \text{and } \left.\frac{d_{E(P_j)}}{dP_j}\right|_{P_j=P_j^{max}} > 0 \\ P_j^{min} & \text{if } \left.\frac{d_{E(P_j)}}{dP_j}\right|_{P_j=P_j^{min}} \geq 0 \end{cases}$$

$$P_e^{D*} = Q\left(\sqrt{\frac{2BE_b}{N_0B+|h_{je}|^2P^*_j)}}\right)$$

$$J^*_I = \frac{P_e^{D*} - P_e^C}{P_e^{D*} - P_e^I} \cdot T_{min}^{PHY}$$

$$J^*_D = \frac{P_e^C - P_e^I}{P_e^{D*} - P_e^C} \cdot J^*_I$$

Compared with the prior art, the present invention adopts the above technical methods and has the following technical effects.

1. The anti-eavesdropping method for the IoV provided by the present invention can overcome the eavesdropping threat from a physical layer. Compared with an anti-eavesdropping method based on high-level encryption, the method of the present invention is not required to perform complicated encryption and decryption operations, reducing the calculation complexity.

2. Based on the fact that loss of some information in a data packet is enough to prevent the whole data packet from being eavesdropped, the present invention provides an intermittent cooperative jamming method, which merely requires a cooperative jamming user to intermittently send a jamming signal within a certain period of time, instead of in the whole data transmission process, thus effectively reducing the energy consumption of the cooperative jamming user and achieving an environmentally friendly effect.

3. The method of the present invention fully considers the unique communication characteristics of the IoV. Duration information of physical-layer data packets in the IoV is obtained based on analysis of an IoV communication protocol, and accordingly an intermittent cooperative jamming method is designed, to guarantee practicality of the method.

4. In different network scenarios, for different modulation manners used by the legitimate sender and at different coding rates, the present invention can accordingly develop different cooperative jamming methods to guarantee anti-eavesdropping performance, thus being universally applicable.

DESCRIPTION OF THE EMBODIMENTS

The technical method of the present invention is further described in detail below with reference to the accompanying drawings.

The present invention can be implemented in different forms, and should not be construed as being limited to the embodiments illustrated herein. On the contrary, these provided embodiments make the disclosure thorough and complete, and fully convey the scope of the present invention to those skilled in the art. In the accompanying drawings, the components are enlarged for clarity.

The present invention discloses an anti-eavesdropping method for the IoV based on intermittent cooperative jamming, including the following steps.

Step 1) Optimization problems are established for a cooperative jamming user $V_j$.

On the premise of effectively preventing an illegitimate user $V_e$ from information eavesdropping, optimization problems are established for the purpose of minimizing an energy consumption of $V_j$.

$$\min_{J_D, J_I, P_j} E = \frac{J_D}{J_D + J_I} \cdot P_j \quad (1)$$

s.t.

$$P_e \geq P_e^C \quad (2)$$

$$P_e^I \leq P_e^C \leq P_e^D \quad (3)$$

$$J_D \pm J_I \leq T_{min}^{PHY} \quad (4)$$

$$\min_{J_D, J_I, P_j} E = \frac{J_D}{J_D + J_I} \cdot P_j \quad (1)$$

s.t.

$$P_e \geq P_e^C \quad (2)$$

$$P_e^I \leq P_e^C \leq P_e^D \quad (3)$$

$$J_D + J_I \leq T_{min}^{PHY} \quad (4)$$

Figure 1:
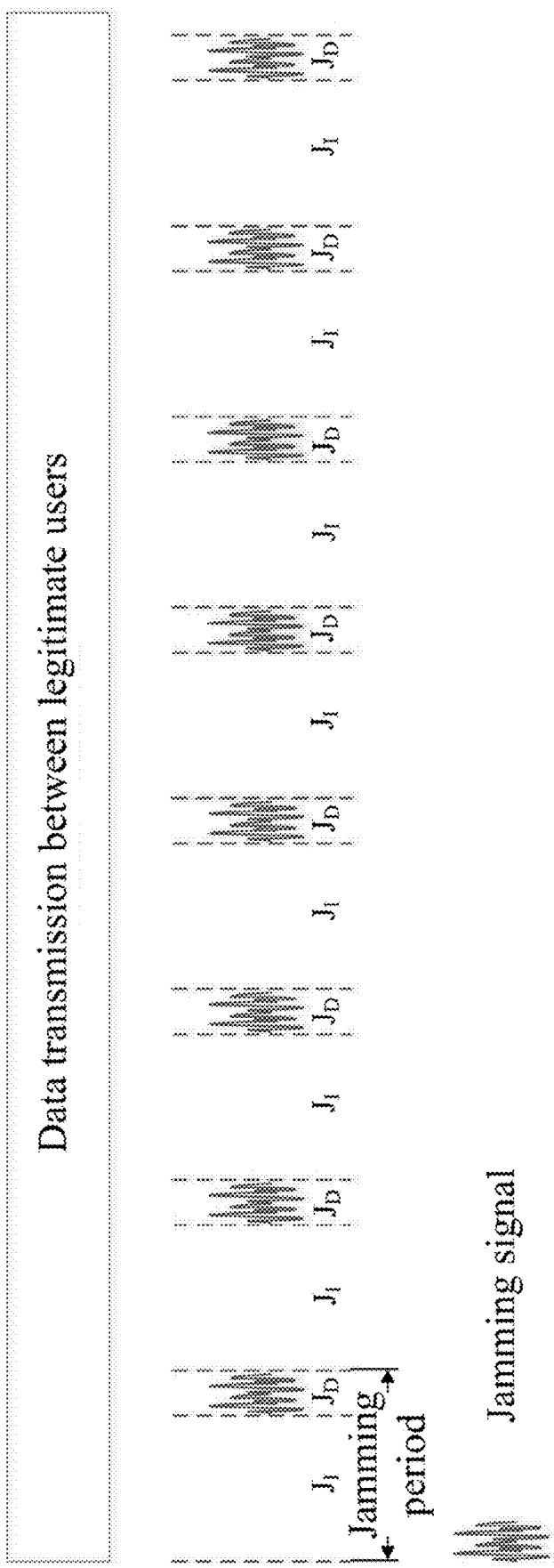
FIG. 1 is a schematic diagram of an intermittent cooperative jamming method.

In an optimization objective (1), $J_D$ is duration of a jamming time slot, and $J_I$ is duration of a jamming interval. $V_j$ sends a jamming signal at power $P_j$ for $J_D$ and then stops sending the jamming signal for $J_I$. $J_D+J_I$ constitutes a jamming cycle which repeats in a period of data transmission between legitimate users, as shown in FIG. 1. Therefore, the optimization objective (1) means to select the optimal $P^*_j$, $J^*_I$, and $J^*_D$ to minimize the energy consumption of $V_j$.

A constraint condition (2) means that $V_j$ must ensure that $V_e$ cannot eavesdrop on the information. In the expression, $P_e^C$ is an error-correcting capability of the illegitimate user $V_e$. When a bit error probability $P_e$ of the information received by $V_e$ exceeds the error-correcting capability thereof, $V_e$ cannot correctly decode and eavesdrop on the information. An expression of $P_e$ is as follows:

$$P_e = \frac{J_D}{J_D + J_I} P_e^D + \frac{J_I}{J_D + J_I} P_e^I.$$

$P_e^D$ is a bit error probability of $V_e$ during $J_D$, and $P_e^I$ is a bit error probability of $V_e$ during $J_I$. The calculation of the bit error probability is relevant to a modulation manner used by a legitimate sender, and four modulation manners used by a sender in the IoV and their corresponding calculation formulas of $P_e^D$ and $P_e^I$ are shown in table 1. In the formulas, $$Q(x) = \frac{1}{\sqrt{2\pi}} \int_x^\infty \exp\left(-\frac{u^2}{2}\right) du$$

is a Q function; $E_b$ is energy spent by $V_e$ in receiving each bit of information; $N_0$ is a noise power spectral density; and $$\phi_j = \frac{P_j |h_{je}|^2}{B}$$

is a power spectral density of a jamming signal received by $V_e$, where $|h_{je}|^2$ is a channel gain between $V_j$ and $V_e$, and B is a channel bandwidth.

Table 1 shows calculation formulas of $P_e^D$ and $P_e^I$.

| Modulation manners | Calculation formulas of $P_e^D$ | Calculation formulas of $P_e^I$ |
|---|---|---|
| BPSK | $Q\left(\sqrt{\frac{2E_b}{N_0 + \phi_j}}\right)$ | $Q\left(\sqrt{\frac{2E_b}{N_0}}\right)$ |
| QPSK | $Q\left(\sqrt{\frac{2E_b}{N_0 + \phi_j}}\right)$ | $Q\left(\sqrt{\frac{2E_b}{N_0}}\right)$ |
| 16-QAM | $\frac{3}{8} Q\left(2\sqrt{\frac{E_b}{N_0 + \phi_j}}\right)$ | $\frac{3}{8} Q\left(2\sqrt{\frac{E_b}{N_0}}\right)$ |
| 64-QAM | $\frac{7}{24} Q\left(\sqrt{\frac{18E_b}{63(N_0 + \phi_j)}}\right)$ | $\frac{7}{24} Q\left(\sqrt{\frac{18E_b}{63N_0}}\right)$ |

A constraint condition (3) has a twofold meaning. First, the method provided by the present invention is applicable to a scenario where the bit error probability $P_e^I$ of $V_e$ during $J_I$ is lower than the error-correcting capability $P_e^C$ thereof; otherwise, cooperative jamming is not required because the illegitimate user cannot eavesdrop on the information. Secondly, $V_j$ must ensure that the bit error probability $P_e^D$ of $V_e$ during $J_D$ is higher than the error-correcting capability $P_e^C$ thereof when selecting $J_D$, $J_I$, and $P_j$; otherwise, the illegitimate user cannot be prevented from information eavesdropping.

In the constraint condition (4), $T_{min}^{PHY}$ is the shortest physical-layer data packet duration in the IoV. This constraint condition means that a cooperative jamming period must be shorter than the shortest physical-layer data packet duration, such that transmission of any physical-layer data packet can be protected by the cooperative jamming user.

Step 2): Unique communication characteristics of the IoV are analyzed based on the WAVE protocol, to obtain time structures of physical-layer data packets in the IoV and physical-layer data packet duration; and then $T_{min}^{PHY}$ in the constraint condition (4) is calculated. $T_{min}^{PHY}$ is relevant to a modulation manner used by the legitimate user and a coding rate, and corresponding results are specifically shown in table 2.

Table 2 shows $T_{min}^{PHY}$ in different modulation manners and at different coding rates.

| Modulation manners | Coding rates | $T_{min}^{PHY}$ (μs) | Modulation manners | Coding rates | $T_{min}^{PHY}$ (μs) |
|---|---|---|---|---|---|
| BPSK | 1/2 | 76 | 16-QAM | 1/2 | 36 |
|  | 3/4 | 60 |  | 3/4 | 32 |
| QPSK | 1/2 | 48 | 64-QAM | 1/2 | 28 |
|  | 3/4 | 40 |  | 3/4 | 28 |

Step 3): For any available power range $P_j \in [P_j^{min}, P_j^{max}]$ for $V_j$, the optimal $P_j^*$, $J_I^*$, and $J_D^*$ are calculated and selected to minimize the energy consumption of $V_j$. For example, in the BPSK modulation manner, the optimal, $J_I^*$, and $J_D^*$ may be calculated by using the formulas (5) to (8); and the optimal results in other modulation manners may also be obtained by calculation.

$$P_j^* = \begin{cases} P_j^{max} & \text{if } \left.\frac{d_{E(P_j)}}{dP_j}\right|_{P_j = P_j^{max}} \leq 0 \\ \left.\frac{d_{E(P_j)}}{dP_j}\right|_{P_j = P_j^*} = 0 & \text{if } \left.\frac{d_{E(P_j)}}{dP_j}\right|_{P_j = P_j^{min}} < 0 \\ & \text{and } \left.\frac{d_{E(P_j)}}{dP_j}\right|_{P_j = P_j^{max}} > 0 \\ P_j^{min} & \text{if } \left.\frac{d_{E(P_j)}}{dP_j}\right|_{P_j = P_j^{min}} \geq 0 \end{cases} \quad (5)$$

$$P_e^{D*} = Q\left(\sqrt{\frac{2BE_b}{N_0 B + |h_{je}|^2 P_j^*}}\right) \quad (6)$$

$$J_I^* = \frac{P_e^{D*} - P_e^C}{P_e^{D*} - P_e^I} \cdot T_{min}^{PHY} \quad (7)$$

$$J_D^* = \frac{P_e^C - P_e^I}{P_e^{D*} - P_e^C} \cdot J_I^* \quad (8)$$

Step 4): According to the calculation results in step 3), $V_j$ sends a jamming signal at the power of $P_j^*$ for the duration of $J_D^*$ in the period of data transmission between legitimate users, and then stops sending the jamming signal for the duration of $J_I^*$. This procedure is repeated periodically until transmission between the legitimate users ends.

Example 1 describes study on optimal intermittent cooperative jamming methods in different network scenarios.

Parameters for describing network scenarios mainly include a noise power spectral density $N_0$, a channel gain $|h_{je}|^2$ between $V_j$ and $V_e$, a channel bandwidth B, energy $E_b$ consumed by $V_e$ in receiving each bit of information, a receiving signal-to-noise ratio $E_b/N_0$ of $V_e$, and an error-correcting capability $P_e^C$ of $V_e$. $|h_{je}|^2$ is determined mainly by environmental factors, and B is stipulated to be 10 MHz in the IEEE 1609 standard. In this example, a legitimate sender uses a BPSK modulation manner and a coding rate of 1/2; $|h_{je}|^2$ is set to a classical value of 0.685; and the maximum transmit power of $V_j$ is 760 mW according to the IEEE 802.11 standard. Based on the foregoing set values, the optimal intermittent cooperative jamming methods in the case of different values of $P_e^C$, $E_b$, and $E_b/N_0$ are studied, and corresponding results are shown in table 3.

Table 3 shows optimal intermittent cooperative jamming methods in different network scenarios.

| Network scenarios | | | Optimal intermittent cooperative jamming methods | | |
|---|---|---|---|---|---|
| $P_e^C$ | $E_b$ | $\frac{E_b}{N_0}$ | $P_j^*$ | $J_D^*$ | $J_I^*$ |
| 0.003 | $10^{-8}$ | 7 dB | 134 mW | 1.50 us | 74.5 us |
| | | 8 dB | 150 mW | 1.94 us | 74.06us |
| | | 9 dB | 162 mW | 2.10 us | 73.90us |
| | | 10 dB | 172 mW | 2.17 us | 73.83us |
| 0.003 | $4 \times 10^{-8}$ | 7 dB | 535 mW | 1.50 us | 74.5 us |
| | | 8 dB | 598 mW | 1.94 us | 74.06us |
| | | 9 dB | 647 mW | 2.10 us | 73.90us |
| | | 10 dB | 686 mW | 2.17 us | 73.83us |
| 0.003 | $6 \times 10^{-8}$ | 7 dB | 760 mW | 2.00 us | 74.00us |
| | | 8 dB | 760 mW | 2.63 us | 73.37us |
| | | 9 dB | 760 mW | 2.90 us | 73.10us |
| | | 10 dB | 760 mW | 3.03 us | 72.97us |
| 0.003 | $8 \times 10^{-8}$ | 7 dB | 760 mW | 2.74 us | 73.26us |
| | | 8 dB | 760 mW | 3.70 us | 72.30us |
| | | 9 dB | 760 mW | 4.16 us | 71.84us |
| | | 10 dB | 760 mW | 4.45 us | 71.55us |
| 0.01 | $10^{-8}$ | 7 dB | 134 mW | 6.22 us | 69.78us |
| | | 8 dB | 150 mW | 6.79 us | 69.21us |
| | | 9 dB | 162 mW | 7.07 us | 68.93us |
| | | 10 dB | 172 mW | 7.24 us | 68.76us |

The following results can be found by observing this example.

(1) The error-correcting capability $P_e^C$ of the illegitimate user $V_e$ mainly influences the duration $J_D^*$ of a jamming time slot and the duration $J_I^*$ of a jamming interval in the intermittent cooperative jamming method. As $P_e^C$ increases, the intermittent cooperative jamming method provided by the present invention sets a longer jamming time slot $J_D^*$ and a shorter jamming interval $J_I^*$.

(2) The energy $E_b$ consumed by $V_e$ in receiving each bit of information first influences the transmit power $P_j^*$ of the cooperative jamming user. When the transmit power of the cooperative jamming user does not reach the maximum value, the intermittent cooperative jamming method provided by the present invention maintains $J_D^*$ and $J_I^*$ unchanged as $E_b$ increases, to first increase the transmit power $P_j^*$ of the cooperative jamming user. Once the transmit power of the cooperative jamming user reaches the maximum value, the intermittent cooperative jamming method provided by the present invention sets a longer jamming time slot $J_D^*$ and a shorter jamming interval $J_I^*$, so as to guarantee anti-eavesdropping performance in the case where $E_b$ increases.

(3) The signal-to-noise ratio $E_b/N_0$ of the signals received by $V_e$ has influence on all of $P_j^*$, $J_D^*$, and $J_I^*$. As $E_b/N_0$ increases, the intermittent cooperative jamming method provided by the present invention sets a higher transmit power $P_j^*$, longer $J_D^*$, and shorter $J_I^*$.

Example 2 describes that observation of the anti-eavesdropping performance of the intermittent cooperative jamming method designed by the present invention and energy consumption of the cooperative jamming user in any physical-layer data packet duration.

This example uses a WLAN toolkit in MATLAB 2018b, which provides relevant functions for simulation of a physical layer in the IoV. In this example, the "wlanNonHTConfig" function is used to generate a non-HT data packet transmitted in the IoV, BPSK is set as the modulation manner, and coding rates of 1/2 and 3/4 are adopted. The "V2VChannel" function is used to generate an IoV channel of which the bandwidth is 10 MHz. A baseband sampling rate for a 10 MHz channel is used and a channel delay model is set to "UrbanNLOS". The channel gain $|h_{je}|^2$ between $V_j$ and $V_e$ is set to 0.685, the energy spent by $V_e$ in receiving each bit of information is $E_b=6\times10^{-8}$, the receiving signal-to-noise ratio $E_b/N_0$ of $V_e$ is 9.68 dB, and the error-correcting capability $P_e^C$ of $V_e$ is 0.046. Based on the foregoing settings, two experiments are carried out in the following.

In the first experiment, BPSK is used as the modulation manner and a coding rate is 1/2. Duration of physical-layer data packets sent by a legitimate sender $V_t$ progressively increases from 76 μs to 608 μs. In each duration time, the legitimate sender sends 2500 data packets. The cooperative jamming user $V_j$ uses the intermittent cooperative jamming method designed by the present invention to interfere with the illegitimate user $V_e$, and to observe a PER (that is, a ratio of the number of data packets $V_e$ cannot correctly decodes to a total number of data packets sent by $V_t$) of the illegitimate user $V_e$ and the energy consumption of the cooperative jamming user.

In the second experiment, BPSK is used as the modulation manner and a coding rate is 3/4. Duration of physical-layer data packets sent by a legitimate sender $V_t$ progressively increases from 60 μs to 412 μs. In each duration time, the legitimate sender sends 2500 data packets. The cooperative jamming user $V_j$ uses the intermittent cooperative jamming method designed by the present invention to interfere with the illegitimate user $V_e$, and to observe a PER (that is, a ratio of the number of data packets $V_e$ cannot correctly decodes to a total number of data packets sent by $V_t$) of the illegitimate user $V_e$ and the energy consumption of the cooperative jamming user.

In the two experiments, the cooperative jamming user acquires the optimal intermittent cooperative jamming methods by the following four steps, and interferes with the illegitimate user.

Step 1: Optimization problems are established for the cooperative jamming user $V_j$.

$$\min_{J_D, J_I, P_j} E = \frac{J_D}{J_D + J_I} \cdot P_j \quad (1)$$

s.t.

$$P_e \geq P_e^C \quad (2)$$

$$P_e^I < P_e^C \leq P_e^D \quad (3)$$

$$J_D + J_I \leq T_{min}^{PHY} \quad (4)$$

s.t.

$$P_e \geq P_e^C \quad (2)$$

$$P_e^I \leq P_e^C \leq P_e^D \quad (3)$$

$$J_D + J_I \leq T_{min}^{PHY} \quad (4)$$

where $$P_e^I = Q\left(\sqrt{\frac{2E_b}{N_0}}\right) = 8.12 \times 10^{-6},$$

$$P_e^D = Q\left(\sqrt{\frac{2E_b}{N_0 + \phi_j}}\right) = Q\left(\sqrt{\frac{1.2}{0.0656 + 0.658P_j}}\right).$$

Step 2: Analysis is performed based on the WAVE protocol, to obtain values of $T_{min}^{PHY}$ at coding rates of 1/2 and 3/4 respectively in the BPSK modulation manner.

| Modulation manner | Coding rates | $T_{min}^{PHY}$ (μs) |
|---|---|---|
| BPSK | 1/2 | 76 |
|  | 3/4 | 60 |

Step 3: The cooperative jamming user $V_3$ finds the optimal intermittent cooperative jamming methods by calculation.

Step 3.1: $P_e^I \leq P_e^C$ is met in the constraint condition (3). It can be learned from $$P_e^D = Q\left(\sqrt{\frac{1.2}{0.0656 + 0.658P_j}}\right)$$

that $P_e^D$ is an increasing function with respect to $P_j$. To meet the constraint condition $P_e^D \geq P_e^C = 0.046$, it can be obtained that $P_j \geq 521.3$ mW. Therefore, an available power range for $V_j$ is $P_j \in [521.3, 760]$ mW.

Step 3.2:

$$P_e = \frac{J_D}{J_D + J_I}P_e^D + \frac{J_I}{J_D + J_I}P_e^I \geq P_e^C$$

in the constraint condition (2); and partial derivatives of $P_e$ with respect to $J_D$ and $P_e^D$ are calculated as follows:

$$\frac{\partial P_e}{\partial J_D} = \frac{P_e^D - P_e^I}{(J_D + J_I)^2} \cdot J_I \geq 0$$

$$\frac{\partial P_e}{\partial J_e^D} = \frac{J_D}{J_D + J_I} \geq 0$$

It can be learned that $P_e$ is an increasing function with respect to $J_D$ and $P_e^D$, and $P_e^D$ is an increasing function with respect to $P_j$. Therefore, $P_e$ is an increasing function with respect to $J_D$ and $P_j$. $J_D$ or $P_j$ needs to be increased to obtain a larger $P_e$. However, the increase of $J_D$ or $P_j$ causes a larger objective function E. In order to minimize the objective function, the constraint condition $P_e \geq P_e^C$ is adjusted to $P_e = P_e^C$, and this equation is solved to obtain:

$$J_D = \frac{P_e^C - P_e^I}{P_e^D - P_e^C}J_I.$$

Step 3.3:

$$J_D = \frac{P_e^C - P_e^I}{P_e^D - P_e^C}J_I$$

is substituted into the constraint condition (4) to obtain $$J_I \leq \frac{P_e^D - P_e^C}{P_e^D - P_e^I} \cdot T_{min}^{PHY}.$$

Because the objective function is a decreasing function with respect to $J_I$, a maximum value of $J_I$ is taken so as to minimize the objective function. Therefore, $$J_I = \frac{P_e^D - P_e^C}{P_e^D - P_e^I} \cdot T_{min}^{PHY}$$

and $$J_D = \frac{P_e^C - P_e^I}{P_e^D - P_e^C}J_I = \frac{P_e^C - P_e^I}{P_e^D - P_e^I} \cdot T_{min}^{PHY}$$

can be obtained, which are substituted into the objective function E to obtain:

$$E = \frac{P_e^C - P_e^I}{P_e^D - P_e^I} \cdot P_j.$$

$$P_e^C = 0.046, \; P_e^I = 8.12 \times 10^{-6}, \; P_e^D = Q\left(\sqrt{\frac{1.2}{0.0656 + 0658P_j}}\right)$$

are substituted into E to learn that E is a convex function with respect to $P_j$. Let $$\frac{d_E}{d_{P_j}} = 0$$

to obtain $P_j = 1007$ mW. Therefore, within the available power range [521.3 mW, 760 mW] for $V_j$, E is a decreasing function with respect to $P_j$. In order to minimize the objective function E, an optimal transmit power $P^*_j = 760$ mW is taken.

Step 3.4: When the modulation manner is BPSK and the coding rate is 1/2, $T_{min}^{PHY} = 76$ μs. When the modulation manner is BPSK and the coding rate is 3/4, $T_{min}^{PHY} = 60$ μs. $P^*_j = 760$ mW is substituted into $$P_e^D = Q\left(\sqrt{\frac{1.2}{0.0656 + 0658P_j}}\right),$$

$$J_I = \frac{P_e^D - P_e^C}{P_e^D - P_e^I} \cdot T_{min}^{PHY},$$

-continued $$J_D = \frac{P_e^C - P_e^I}{P_e^D - P_e^I} T_{min}^{PHY},$$

to obtain the following results.

| Modulation manner | Coding rates | Optimal intermittent cooperative jamming methods | | |
|---|---|---|---|---|
| | | $P_j^*$ | $J_D^*$ | $J_I^*$ |
| BPSK | 1/2 | 760 mW | 47.12 μs | 28.88 μs |
| | 3/4 | 760 mW | 37.2 μs | 22.8 μs |

Step 4: According to the calculation results in step 3, $V_j$ sends a jamming signal at the power of $P^*_j$ for the duration of $J_D^*$ in the period of data transmission between legitimate users, and then stops sending the jamming signal for the duration of $J^*_I$; and this procedure is repeated periodically until transmission between the legitimate users ends.

Figure 2:
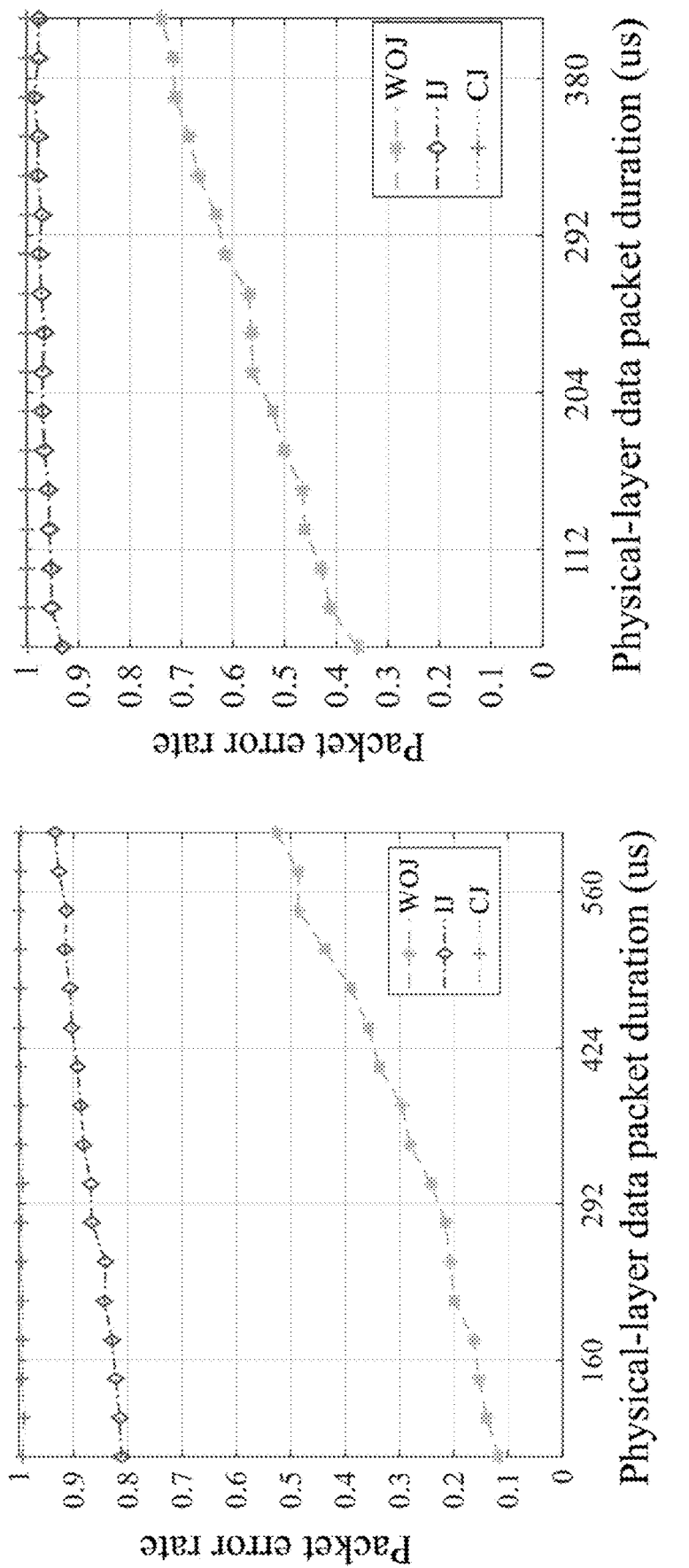
FIG. 2 shows packet error rates (PERs) of an illegitimate user in different physical-layer data packet duration in a BPSK modulation manner and at coding rates of 1/2 and 3/4 respectively.
Figure 3:
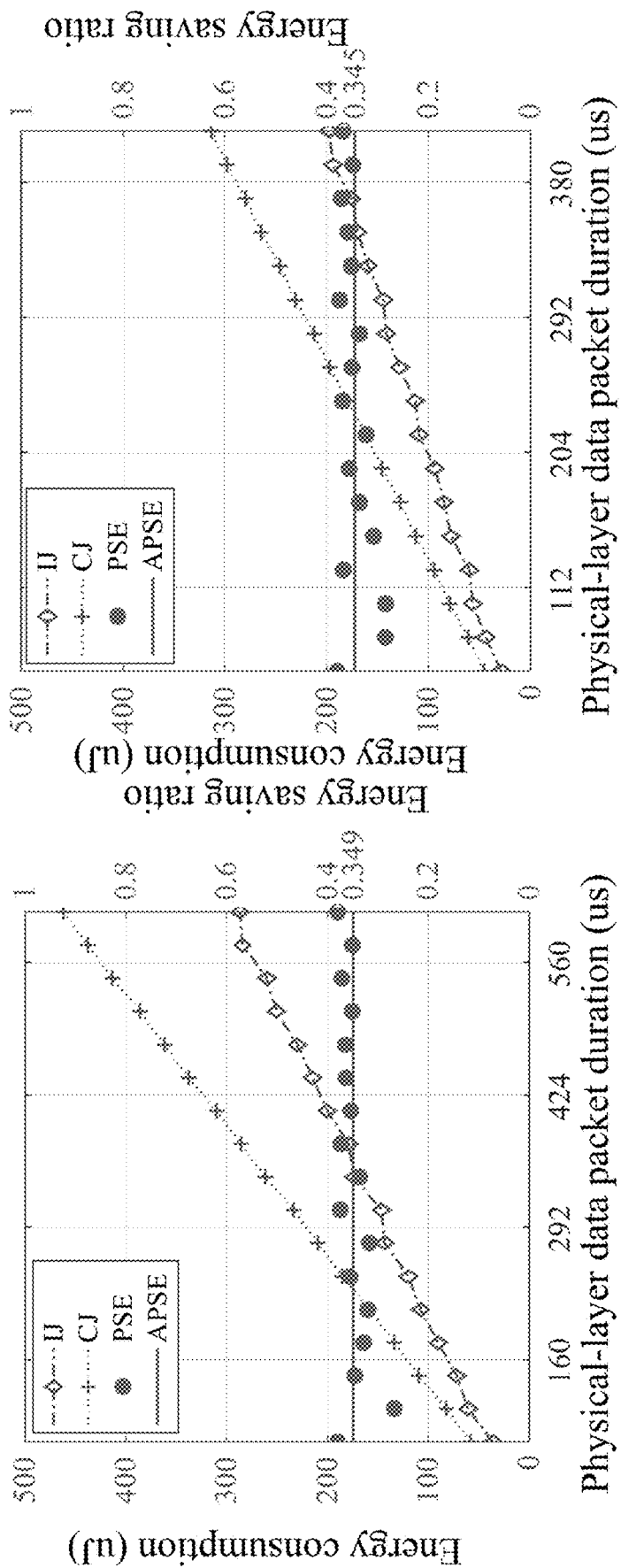
FIG. 3 shows energy consumptions of a cooperative jamming user in different physical-layer data packet duration in a BPSK modulation manner and at coding rates of 1/2 and 3/4 respectively.

Experimental results of the two experiments are shown in FIGS. 2 and 3. In the figures, WOJ represents that no interference is made with $V_e$; IJ represents the intermittent cooperative jamming method designed by the present invention; CJ represents the conventional continuous cooperative jamming method, that is, the cooperative jamming user continuously sending a jamming signal during the whole period of data transmission between the legitimate users; PSE is referred to as an energy saving ratio, which means a ratio of energy that can be saved in the IJ method as compared with that in the CJ method to the energy spent by using the CJ method; and APSE is referred to as an average energy saving ratio and represents an average value of PSE.

It can be found by observing FIG. 2 that, under the interference with $V_e$ by using the IJ method, the PER of $V_e$ is not lower than 80% and the accuracy of data packets eavesdropped by the illegitimate user is lower than 20%. Thus, it can be known that the anti-eavesdropping method based on intermittent cooperative jamming of the present invention can effectively prevent the illegitimate user from eavesdropping on information.

When no interference is made with $V_e$ (WOJ) or the LT method is used to interfere with $V_e$, the PER of $V_e$ increases as the physical-layer data packet duration increases. The reason is that the number of information bits included in a physical-layer data packet increases as the physical-layer data packet duration increases, and the probability in which some information bits in the data packets received by $V_e$ cannot be correctly decoded increases, thus enhancing the PER of $V_e$. When the CJ method is used to interfere with $V_e$, because the cooperative jamming user continuously sends a jamming signal, the signal-to-noise ratio of $V_e$ is low all the time and thus the PER of $V_e$ is known to be close to 100%. By using the same jamming method, the PER of the illegitimate user at the coding rate of 3/4 is higher than that at the coding rate of 1/2. The reason is that in different coding manners, more information bits are included in a physical-layer data packet at the coding rate of 3/4, easily resulting in packet errors.

As shown in FIG. 3, it can be found that the energy consumption of the cooperative jamming user increases as the physical-layer data packet duration increases in either of the IJ and CJ methods. The reason is that the duration in which the cooperative jamming user needs to send a jamming signal is prolonged as the physical-layer data packet duration increases, thus enhancing the energy consumption of the cooperative jamming user. The orange points show energy saving ratios corresponding to different physical-layer data packet duration and achieved by using the IJ method, and the orange line shows an average value of the energy saving ratios. It can be found that, when the coding rate is 1/2, the intermittent cooperative jamming method of the present invention can save energy by 34.9%; and when the coding rate is 3/4, the intermittent cooperative jamming method of the present invention can save energy by 34.5%, thus dramatically reducing the energy consumption of the cooperative jamming user and achieving an environmentally friendly effect.

Those skilled in the art should understand that, unless otherwise defined, all terms (including technical and scientific terms) used herein have the same meaning as commonly understood by those of ordinary skill in the art to which the present invention belongs. It should be further understood that, terms such as those defined in a general dictionary should be construed as having meanings consistent with the meanings in the context of the prior art. Unless defined as herein, these terms will not be interpreted in an ideal or overly formal way.

The specific implementation manners described above further describe the purpose, technical methods, and beneficial effects of the present invention in further detail. It should be understood that the above descriptions are only specific embodiments of the present invention and are not intended to limit the present invention. Any modifications, equivalent replacements or improvements made within the spirit and principle of the present application shall fall within the protection scope of the present invention.

What is claimed is:

1. An anti-eavesdropping method for the Internet of Vehicles (boy) based on intermittent cooperative jamming, comprising the following steps:

step 1): on the premise of effectively preventing an illegitimate user $V_e$ from information eavesdropping, establishing optimization problems for the purpose of minimizing an energy consumption of a cooperative jamming user $V_j$:

$$\min_{J_D, J_I, P_j} E = \frac{J_D}{J_D + J_I} \cdot P_j \quad (1)$$

s.t.

$$P_e \geq P_e^C \quad (2)$$

$$P_e^I \leq P_e^C \leq P_e^D \quad (3)$$

$$J_D + J_I \leq T_{min}^{PHY} \quad (4)$$

$$\min_{J_D, J_I, P_j} E = \frac{J_D}{J_D + J_I} \cdot P_j \quad (1)$$

s.t.

$$P_e \geq P_e^C \quad (2)$$

$$P_e^I \leq P_e^C \leq P_e^D \quad (3)$$

$$J_D + J_I \leq T_{min}^{PHY} \quad (4)$$

wherein the expression (1) is an optimization objective, and the expressions (2), (3), and (4) are all constraint conditions; in these expressions, $J_D$ is duration of a jamming time slot, and $J_I$ is duration of a jamming interval; $V_j$ sends a jamming signal at power $P_j$ for $J_D$ and then stops sending the jamming signal for $J_I$; $J_D+J_I$ constitutes a jamming cycle which repeats in a period of data transmission between legitimate users; $P_e^C$ is an error-correcting capability of the illegitimate user $V_e$;

$$P_e = \frac{J_D}{J_D+J_I}P_e^D + \frac{J_I}{J_D+J_I}P_e^I; P_e^D$$

is a bit error probability of $V_e$ during $J_D$, and $P_e^I$ is a bit error probability of $V_e$ during $J_I$; and $T_{min}^{PHY}$ is the shortest physical-layer data packet duration in the IoV; TP
- step 2): analyzing unique communication characteristics of the IoV based on the Wireless Access in Vehicular Environments (WAVE) protocol, to obtain time structures of physical-layer data packets in the IoV and physical-layer data packet duration; and calculating $T_{min}^{PHY}$ in the expression (4);
- step 3): for any available power range $P_j \in [P_j^{min}, P_j^{max}]$ for the cooperative jamming user $V_j$, calculating the optimal $P^*_j$, $J^*_I$, and $J^*_D$ to minimize the energy consumption of $V_j$; and
- step 4): according to the calculation results in step 3), sending, by the user $V_j$, a jamming signal at the power of $P^*_j$ for the duration of $J^*_D$ in the period of data transmission between legitimate users, and then stopping sending the jamming signal for the duration of $J^*_I$; and repeating this procedure periodically until transmission between the legitimate users ends.

2. The anti-eavesdropping method for the IoV based on intermittent cooperative jamming according to claim 1, wherein in step 1), calculation formulas of $P_e^D$ and $P_e^I$ are relevant to a modulation manner used by a legitimate sender; a Q function is let to be $$Q(x) = \frac{1}{\sqrt{2\pi}} \int_x^\infty \exp\left(-\frac{u^2}{2}\right) du;$$

$E_b$ is energy spent by $V_e$ in receiving each bit of information; $N_0$ is a noise power spectral density; and $$\phi_j = \frac{P_j |h_{je}|^2}{B}$$

is a power spectral density of a jamming signal received by $V_e$, $|h_{je}|^2$ being a channel gain between $V_j$ and $V_e$, and B being a channel bandwidth; then:
when the modulation manner used by the legitimate sender is binary phase-shift keying (BPSK), $$P_e^D = Q\left(\sqrt{\frac{2E_b}{N_0+\phi_j}}\right),$$

$$P_e^I = Q\left(\sqrt{\frac{2E_b}{N_0}}\right);$$

when the modulation manner used by the legitimate sender is quadrature phase-shift keying (QPSK), $$P_e^D = Q\left(\sqrt{\frac{2E_b}{N_0+\phi_j}}\right),$$

$$P_e^I = Q\left(\sqrt{\frac{2E_b}{N_0}}\right);$$

when the modulation manner used by the legitimate sender is 16 quadrature amplitude modulation (16-QAM), $$P_e^D = \frac{3}{8}Q\left(2\sqrt{\frac{E_b}{N_0+\phi_j}}\right),$$

$$P_e^I = \frac{3}{8}Q\left(2\sqrt{\frac{E_b}{N_0}}\right);$$

and
when the modulation manner used by the legitimate sender is 64-QAM, $$P_e^D = \frac{7}{24}Q\left(\sqrt{\frac{18E_b}{63(N_0+\phi_j)}}\right),$$

$$P_e^I = \frac{7}{24}Q\left(\sqrt{\frac{18E_b}{63N_0}}\right).$$

3. The anti-eavesdropping method for the IoV based on intermittent cooperative jamming according to claim 2, wherein in step 2), $T_{min}^{PHY}$ is relevant to the modulation manner used by the legitimate user and a coding rate:
- when the modulation manner used by the legitimate sender is BPSK and the coding rate is 1/2, $T_{min}^{PHY}$=76 μs;
- when the modulation manner used by the legitimate sender is BPSK and the coding rate is 3/4, $T_{min}^{PHY}$=60 μs;
- when the modulation manner used by the legitimate sender is QPSK and the coding rate is 1/2, $T_{min}^{PHY}$=48 μs;
- when the modulation manner used by the legitimate sender is QPSK and the coding rate is 3/4, $T_{min}^{PHY}$=40 μs;
- when the modulation manner used by the legitimate sender is 16-QAM and the coding rate is 1/2, $T_{min}^{PHY}$=36 μs;
- when the modulation manner used by the legitimate sender is 16-QAM and the coding rate is 3/4, $T_{min}^{PHY}$=32 μs;
- when the modulation manner used by the legitimate sender is 64-QAM and the coding rate is 1/2, $T_{min}^{PHY}$=28 μs; and
- when the modulation manner used by the legitimate sender is 64-QAM and the coding rate is 3/4, $T_{min}^{PHY}$=28 μs.

4. The anti-eavesdropping method for the IoV based on intermittent cooperative jamming according to claim 3, wherein in step 3), when the modulation manner used by the legitimate sender is BPSK, calculation formulas of $P^*_j$, $J^*_I$, and $J^*_D$ are as follows:

$$P_j^* = \begin{cases} P_j^{max} & \text{if } \dfrac{d_{E(P_j)}}{dP_j}\bigg|_{P_j=P_j^{max}} \leq 0 \\ \dfrac{d_{E(P_j)}}{dP_j}\bigg|_{P_j=P_j^*} = 0 & \text{if } \dfrac{d_{E(P_j)}}{dP_j}\bigg|_{P_j=P_j^{min}} < 0 \\ & \text{and } \dfrac{d_{E(P_j)}}{dP_j}\bigg|_{P_j=P_j^{max}} > 0 \\ P_j^{min} & \text{if } \dfrac{d_{E(P_j)}}{dP_j}\bigg|_{P_j=P_j^{min}} \geq 0 \end{cases}$$

$$P_e^{D*} = Q\left(\sqrt{\dfrac{2BE_b}{N_0 B + |h_{je}|^2 P_j^*}}\right)$$

$$J_I^* = \dfrac{P_e^{D*} - P_e^C}{P_e^{D*} - P_e^I} \cdot T_{min}^{PHY}$$

$$J_D^* = \dfrac{P_e^C - P_e^J}{P_e^{D*} - P_e^C} \cdot J_I^*$$

$$P_e^{D*} = Q\left(\sqrt{\dfrac{2BE_b}{N_0 B + |h_{je}|^2 P_j^*}}\right)$$

$$J_I^* = \dfrac{P_e^{D*} - P_e^C}{P_e^{D*} - P_e^I} \cdot T_{min}^{PHY}.$$

\* \* \* \* \*